US012236887B2

(12) United States Patent
Ikeda et al.

(10) Patent No.: US 12,236,887 B2
(45) Date of Patent: Feb. 25, 2025

(54) DISPLAY APPARATUS AND CONTROL METHOD

(71) Applicant: CANON KABUSHIKI KAISHA, Tokyo (JP)

(72) Inventors: Makoto Ikeda, Kanagawa (JP); Takashi Ichimiya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/354,803

(22) Filed: Jul. 19, 2023

(65) Prior Publication Data

US 2024/0054958 A1 Feb. 15, 2024

(30) Foreign Application Priority Data

Aug. 9, 2022 (JP) ................................ 2022-127325

(51) Int. Cl.

*G09G 3/30* (2006.01)
*G09G 3/3233* (2016.01)
*G09G 3/3258* (2016.01)

(52) U.S. Cl.

CPC ......... *G09G 3/3258* (2013.01); *G09G 3/3233* (2013.01); *G09G 2300/0852* (2013.01); *G09G 2300/0861* (2013.01); *G09G 2320/0233* (2013.01); *G09G 2320/041* (2013.01); *G09G 2320/0626* (2013.01); *G09G 2320/08* (2013.01); *G09G 2354/00* (2013.01)

(58) Field of Classification Search

CPC ............... G09G 3/3258; G09G 3/3233; G09G 2300/0852; G09G 2300/0861; G09G 2320/0233; G09G 2320/041; G09G 2320/0626; G09G 2320/08; G09G 2354/00; G09G 3/3208; G09G 3/3275; G09G 3/22; H05B 45/39

USPC .................................. 315/192; 345/77, 75.2

See application file for complete search history.

(56) References Cited

U.S. PATENT DOCUMENTS

2004/0189553 A1* 9/2004 Kabuto .................... G09G 3/22 345/75.2
2005/0156837 A1* 7/2005 Kasai .................. G09G 3/3275 345/77
2007/0075940 A1 4/2007 Nakamura
2008/0246702 A1* 10/2008 Lee ...................... G09G 3/3233 345/77
2011/0260633 A1* 10/2011 Takeda ................... H05B 45/39 315/192
2019/0096328 A1* 3/2019 Chen .................... G09G 3/3208
2020/0090588 A1* 3/2020 Nielsen ................ G09G 3/3275
2023/0125418 A1* 4/2023 Zen ...................... G09G 3/3208

FOREIGN PATENT DOCUMENTS

JP 2007-101951 A 4/2007

* cited by examiner

*Primary Examiner* — Abdul-Samad A Adediran
(74) *Attorney, Agent, or Firm* — Venable LLP

(57) ABSTRACT

A display apparatus includes light emitting elements that are driven by current and a voltage control unit that controls a driving voltage for driving the light emitting elements based on a temperature of the display apparatus. The voltage control unit performs control such that an amount of change in the driving voltage per unit time does not exceed a predetermined limited range. The predetermined limited range is determined based on a relationship between the change in the driving voltage and a change in a light emission luminance of the light emitting elements.

16 Claims, 8 Drawing Sheets

DISPLAY APPARATUS AND CONTROL METHOD

BACKGROUND OF THE INVENTION

Field of the Invention

The present invention relates to a technique for driving light emitting elements.

Description of the Related Art

Organic electroluminescence (EL) displays are used in mobile devices, such as smart devices, due to having a higher contrast than liquid crystal displays and backlight being unnecessary (Japanese Patent Laid-Open No. 2007-101951).

In organic EL displays, light emission luminance is controlled by the amount of current flowing across light emitting elements, such as organic light emitting diodes (OLEDs), and while light emission luminance increases as the amount of current flowing across the light emitting elements increases, power consumption increases, and the amount of generated heat also increases. In addition, when a driving voltage to be applied to the light emitting elements is changed dramatically in order to increase the amount of current flowing across the light emitting elements, the light emission luminance will also be dramatically changed, and display quality will deteriorate.

SUMMARY OF THE INVENTION

The present invention has been made in consideration of the aforementioned problems, and realizes a technique for reducing heat generation and display quality deterioration of a display apparatus.

In order to solve the aforementioned problems, the present invention provides a display apparatus comprising: light emitting elements that are driven by current; and a voltage control unit that controls a driving voltage for driving the light emitting elements based on a temperature of the display apparatus, wherein the voltage control unit performs control such that an amount of change in the driving voltage per unit time does not exceed a predetermined limited range, and wherein the predetermined limited range is determined based on a relationship between the change in the driving voltage and a change in a light emission luminance of the light emitting elements.

In order to solve the aforementioned problems, the present invention provides a display apparatus comprising: light emitting elements that are driven by current; and a voltage control unit that controls a driving voltage for driving the light emitting elements based on a temperature of the display apparatus, wherein the voltage control unit changes the driving voltage when a display luminance of the display apparatus is changed.

In order to solve the aforementioned problems, the present invention provides a method of controlling a display apparatus having light emitting elements to be driven by current, the method comprising: controlling a driving voltage for driving the light emitting elements based on a temperature of the display apparatus, wherein in the controlling, an amount of change in the driving voltage per unit time is controlled so as not to exceed a predetermined limited range, and wherein the predetermined limited range is determined based on a relationship between the change in the driving voltage and a change in a light emission luminance of the light emitting elements.

In order to solve the aforementioned problems, the present invention provides a non-transitory computer-readable storage medium storing a program for causing a computer to function as a display apparatus comprising: light emitting elements that are driven by current; and a voltage control unit that controls a driving voltage for driving the light emitting elements based on a temperature of the display apparatus, wherein the voltage control unit performs control such that an amount of change in the driving voltage per unit time does not exceed a predetermined limited range, and wherein the predetermined limited range is determined based on a relationship between the change in the driving voltage and a change in a light emission luminance of the light emitting elements.

According to the present invention, it is possible to reduce heat generation and display quality deterioration of a display apparatus.

Further features of the present invention will become apparent from the following description of exemplary embodiments (with reference to the attached drawings).

DESCRIPTION OF THE EMBODIMENTS

Figure 1:
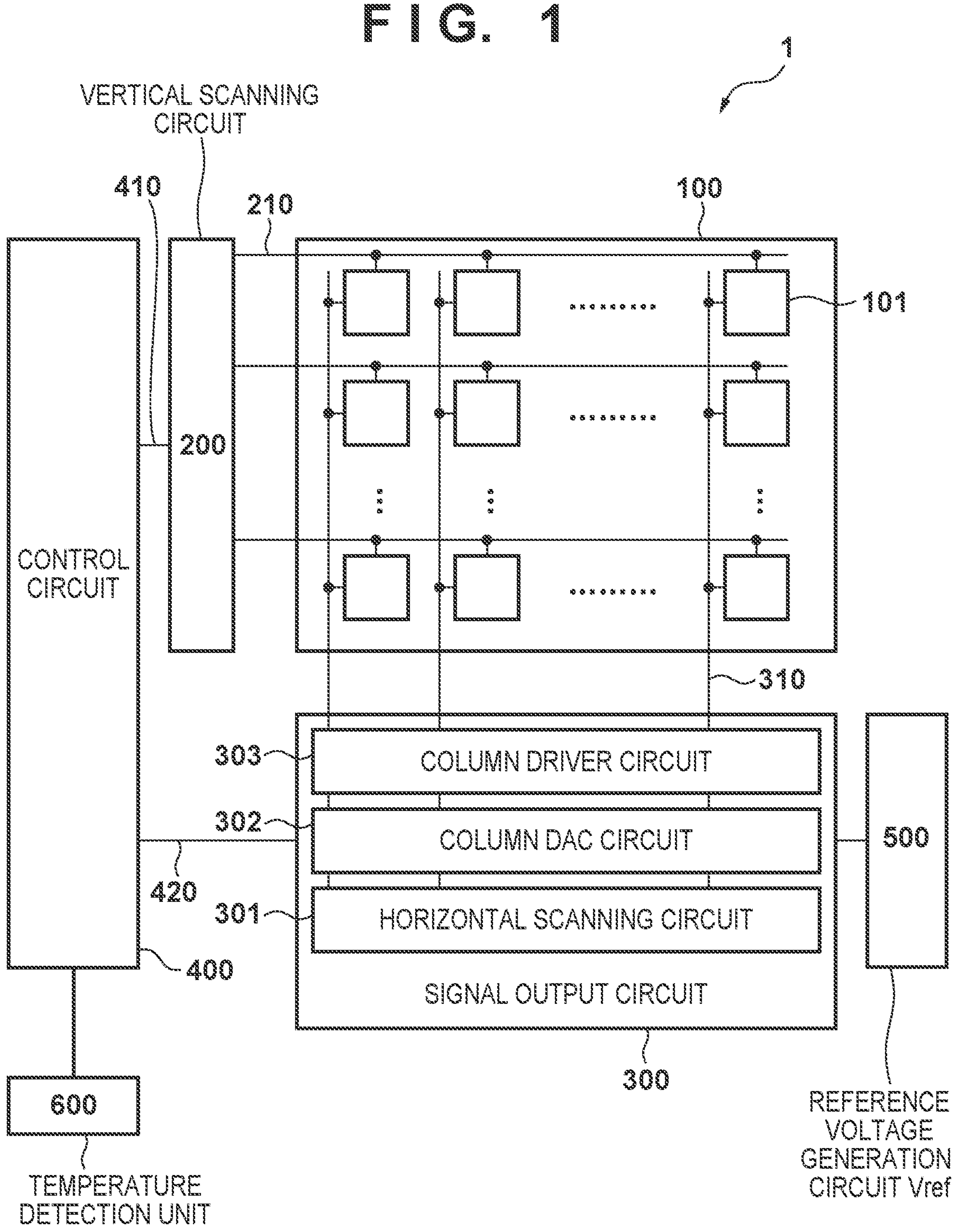
FIG. 1 is a block diagram illustrating a hardware configuration of a display apparatus according to the present embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

In the following, an embodiment in which a display apparatus according to the present invention is applied to an organic electroluminescence display, which is provided in an image capture apparatus, such as a digital camera, and light emitting elements, such as organic light emitting diodes (OLEDs), are driven will be described in detail with reference to accompanying drawings.

The display apparatus according to the present invention is not limited to an organic EL display, and is widely applicable to display apparatuses provided with current-driven light emitting elements. In addition, the image capture apparatus to which the display apparatus according to the present invention is applied is not limited to a digital camera or the like and is also applicable to mobile devices, such as smartphone devices and tablet devices, as well as personal computers (PCs), television receiver displays, and the like.

First Embodiment

First, a display apparatus 1 according to the present embodiment will be described with reference to FIGS. 1 to 5.

FIG. 1 is a block diagram illustrating a hardware configuration of the display apparatus according to the present embodiment.

The display apparatus 1 includes a pixel array 100 including a plurality of pixels 101. The pixel array 100 includes the plurality of pixels 101 arranged two-dimensionally in a plurality of row directions (horizontal directions or lateral directions) and a plurality of column directions (vertical directions or longitudinal directions), which are perpendicular to each other. Regarding each of the pixels (unit pixels) 101, a control signal is inputted from a vertical scanning circuit 200 via a scan line 210, and a luminance signal Vsig, which is an image signal, is inputted from a signal output circuit 300 via a signal line 310.

The vertical scanning circuit 200 is controlled by a control signal outputted from a control circuit 400 via a control line 410. The signal output circuit 300 is controlled by a control signal outputted from the control circuit 400 via a control line 420. The unit pixels 101 each include a light emitting diode (light emitting element) and emit light whose amount corresponds to the luminance signal Vsig inputted to the respective unit pixels 101. Each of the pixels 101 may include a plurality of sub-pixels arranged for each of RGB colors. In such a case, the signal lines 310 are arranged on a column-by-column basis with respect to each of the sub-pixels. For example, when one pixel includes three sub-pixels, three signal lines 310 are arranged for one pixel column.

The signal output circuit 300 includes a horizontal scanning circuit 301; a column DAC circuit 302, which is provided so as to correspond to the pixels in the plurality of column directions; and a column driver circuit 303, which is provided so as to correspond to the pixels of the plurality of column directions. In the present embodiment, one column DAC circuit 302 and one column driver circuit 303 correspond. An image signal scanned by the horizontal scanning circuit 301 and inputted in each of the column directions is converted into an analog signal by the column DAC circuit 302 and then outputted as the luminance signal Vsig from the column driver circuit 303 to a pixel in each of the column directions. A reference voltage generation circuit 500 generates a number of analog voltages Vref corresponding to the image signal in each of the column directions (e.g., when the image signal is 8 bits, 256 analog voltages) and supplies it to the column DAC circuit 302.

The control circuit 400 controls a second voltage VCAT for setting a driving voltage Vdf for causing light emitting elements 110, which will be described later, to emit light based on the temperature of the display apparatus 1 obtained from a temperature detection unit 600. The second voltage VCAT corresponds to the voltage of the cathode (negative) side of the light emitting device 110 of a unit pixel 101 to be described later in FIG. 2. The temperature detection unit 600 detects the temperature of the display apparatus 1. The temperature of the display apparatus 1 is, for example, the temperature of the light emitting elements 110 inside the display apparatus 1, the temperature of the substrate of the pixel array 100, or the temperature of at least one location in their vicinity.

Figure 2:
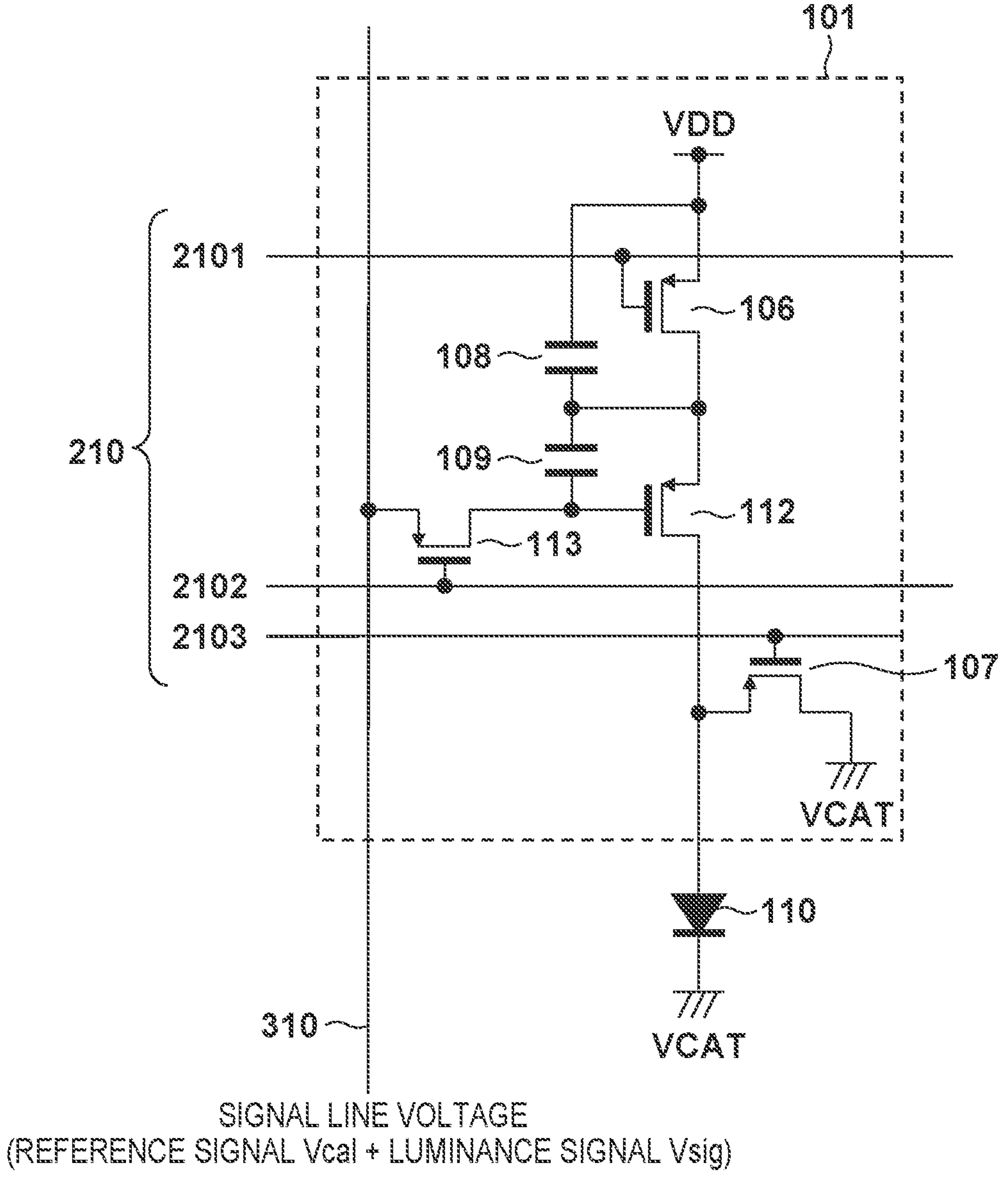
FIG. 2 is a circuit diagram illustrating a configuration of a unit pixel according to the present embodiment.

FIG. 2 is a circuit diagram illustrating a configuration of a unit pixel 101 according to the present embodiment.

The light emitting element 110 is an organic light emitting diode (OLED), which emits light whose amount corresponds to the amount of current flowing across the light emitting element 110. Regarding the light emitting element 110, the amount of light emission increases as the amount of current flowing across the light emitting element 110 increases, and the amount of light emission decreases as the amount of current flowing across the element decreases.

A driving element 112 is a transistor for supplying the light emitting element 110 with a driving current for causing the light emitting element 110 to emit light.

A signal voltage holding element 113 is a transistor for applying a signal voltage to the gate of the driving element 112.

A first capacitive element 108 and a second capacitive element 109 are capacitors for holding the gate voltage of the driving element 112 at the signal voltage when the signal voltage holding element 113 is in an on state. Even when the signal voltage holding element 113 in an off state, the gate voltage of the driving element 112 is held at the signal voltage by the first capacitive element 108 and the second capacitive element 109, and so, the driving element 112 can be operated at a constant current.

A light emission control element 106 is a transistor for supplying current from a first voltage VDD to the driving element 112 in order to perform light emission control by supplying a driving current from the driving element 112 to the light emitting element 110. A reset element 107 is a transistor for stopping light emission by cutting off the supply of current to the light emitting element 110 by causing the driving current flowing from the driving element 112 to the light emitting element 110 to be bypassed to a voltage VCAT, which is upstream of the light emitting element 110.

The scan lines 210 apply a signal voltage to the respective gates of the switch elements 106, 107, and 113 for controlling timings at which the switch elements 106, 107, and 113 are turned on and off. The scan lines 210 include a first scan line 2101 for controlling the timings at which the light emission control element 106 is turned on and off, a second scan line 2102 for controlling the timings at which the signal voltage holding element 113 is turned on and off, and a third scan line 2103 for controlling the timings at which the reset element 107 is turned on and off.

Regarding the unit pixel 101, the driving element 112 operates as a current source due to a potential difference Vdf between the first voltage Vdd on the anode (positive) side of the light emitting element 110 and the second voltage VCAT (<VDD) on the cathode (negative) side of the light emitting element 110. The light emitting element 110 emits light due to current flowing across the light emitting element 110 due to the potential difference Vdf between the first voltage VDD and the second voltage VCAT. In addition, regarding the light emitting element 110, the amount of light of the light emitting element 110 changes by the second voltage VCAT being changed while the first voltage VDD is constant. Therefore, by limiting the amount of change in the potential difference Vdf between the first voltage VDD and the second voltage VCAT, it is possible to reduce power consumption of the light emitting element 110 as well as luminance fluctuations caused by fluctuations in the current flowing across the light emitting element 110.

However, when the amount of change in the second voltage VCAT is increased due to parasitic capacitance between wiring on the drain side (VCAT side) of the driving element 112 and the gate of the driving element 112, the luminance signal Vsig, which is the gate voltage of the driving element 112, transiently fluctuates. This causes the light emission luminance of the light emitting element 110 to dramatically fluctuate, and so, the display quality deteriorates.

Therefore, in the present embodiment, as will be described later in FIGS. 3 to 5, power consumption, heat generation, and display quality deterioration of the display apparatus 1 is reduced by the driving voltage Vdf (second voltage VCAT) of the light emitting element 110 being appropriately controlled according to the luminance setting (screen brightness setting) and the change in temperature of the display apparatus 1.

Figure 3:
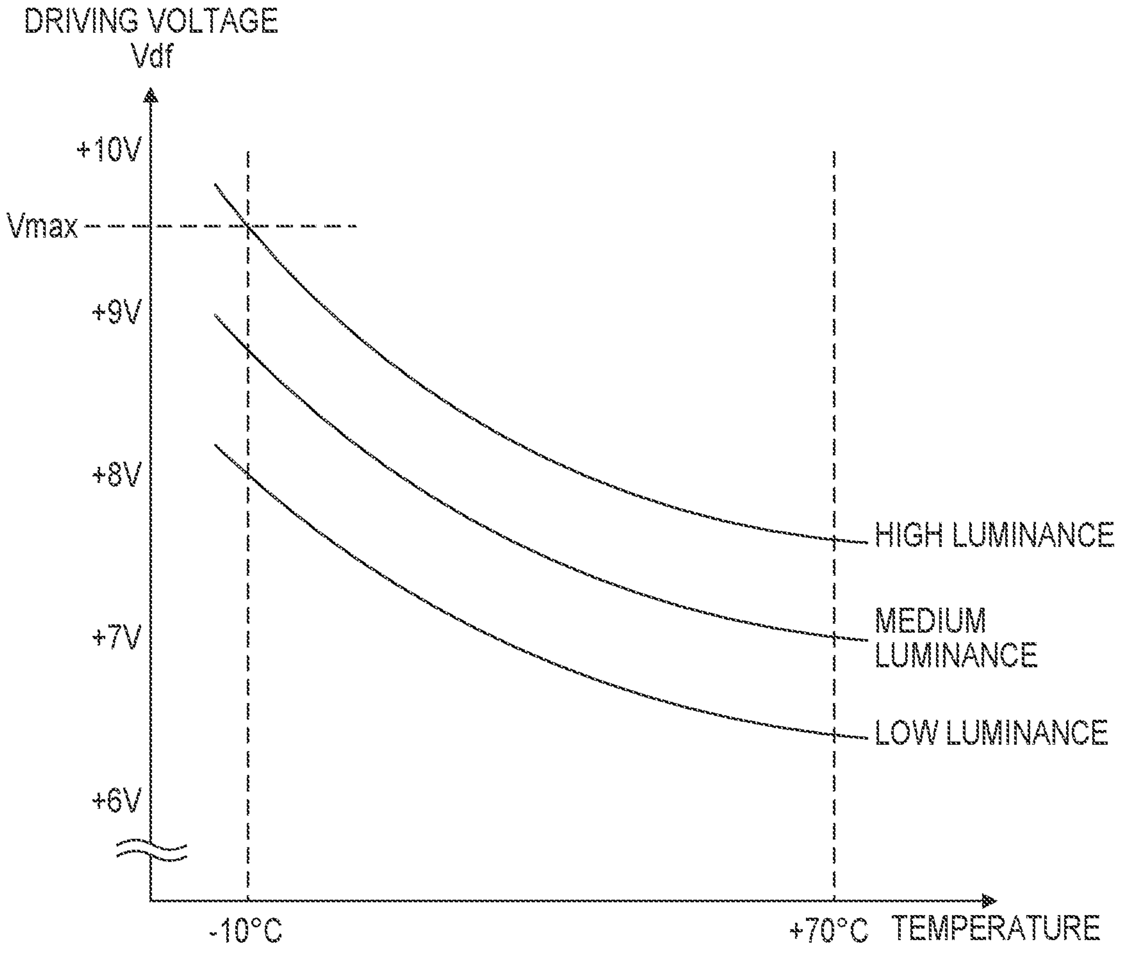
FIG. 3 is a diagram illustrating a relationship between a driving voltage and the temperature of light emitting elements according to the present embodiment.

FIG. 3 exemplifies a relationship between the driving voltage Vdf and the temperature of the light emitting elements 110. In FIG. 3, the horizontal axis exemplifies the temperature of the display apparatus 1, and the vertical axis exemplifies the driving voltage. In addition, in the example of FIG. 3, three types of luminance setting, which are high luminance, medium luminance, and low luminance, are exemplified as light emission luminance. The luminance setting indicates a relationship between temperature and the driving voltage Vdf with which 255 gradations of luminance can be displayed, and for example, high luminance is 1000 cd, medium luminance is 800 cd, and low luminance is 500 cd. In addition, the temperature corresponds to the temperature of the display apparatus 1.

As illustrated in FIG. 3, the driving voltage Vdf of the light emitting elements 110 increases as the temperature of the display apparatus 1 decreases, and so, necessary voltage increases as the light emission luminance of the light emitting elements 110 increases. That is, it can be said that the relationship of FIG. 3 indicates a relationship between the change in the driving voltage and the change in the light emission luminance of the light emitting elements 110. At the start of the display of the display apparatus 1 (at the start of light emission of the light emitting elements 110), light is emitted with a maximum voltage necessary for the light emitting elements 110 to emit light as an initial setting of the driving voltage Vdf of the light emitting elements 110, based on a maximum luminance and a displayable temperature range of the light emitting elements 110.

Then, in the present embodiment, the amount of change in the driving voltage Vdf of the light emitting elements 110 per unit time is limited according to the luminance setting and the change in temperature of the display apparatus 1. The amount of change in the driving voltage Vdf of the light emitting elements 110 per unit time includes at least one of the amount of change in the driving voltage Vdf at one time and a period (update frequency) at which the driving voltage Vdf is changed. Specifically, when the temperature of the display apparatus 1 decreases, if the driving voltage Vdf does not follow the temperature change, the driving voltage Vdf becomes insufficient and an image cannot be displayed, and so, the update frequency is increased (the period is shortened) so as to quickly change the driving voltage Vdf. In addition, when the temperature of the display apparatus 1 increases, a case where an image cannot be displayed does not occur even if the driving voltage Vdf does not follow the temperature change, and so, the update frequency is decreased (the period is lengthened) so as to reduce the luminance fluctuations, and the driving voltage Vdf is made to change as slowly as possible.

Figure 4:
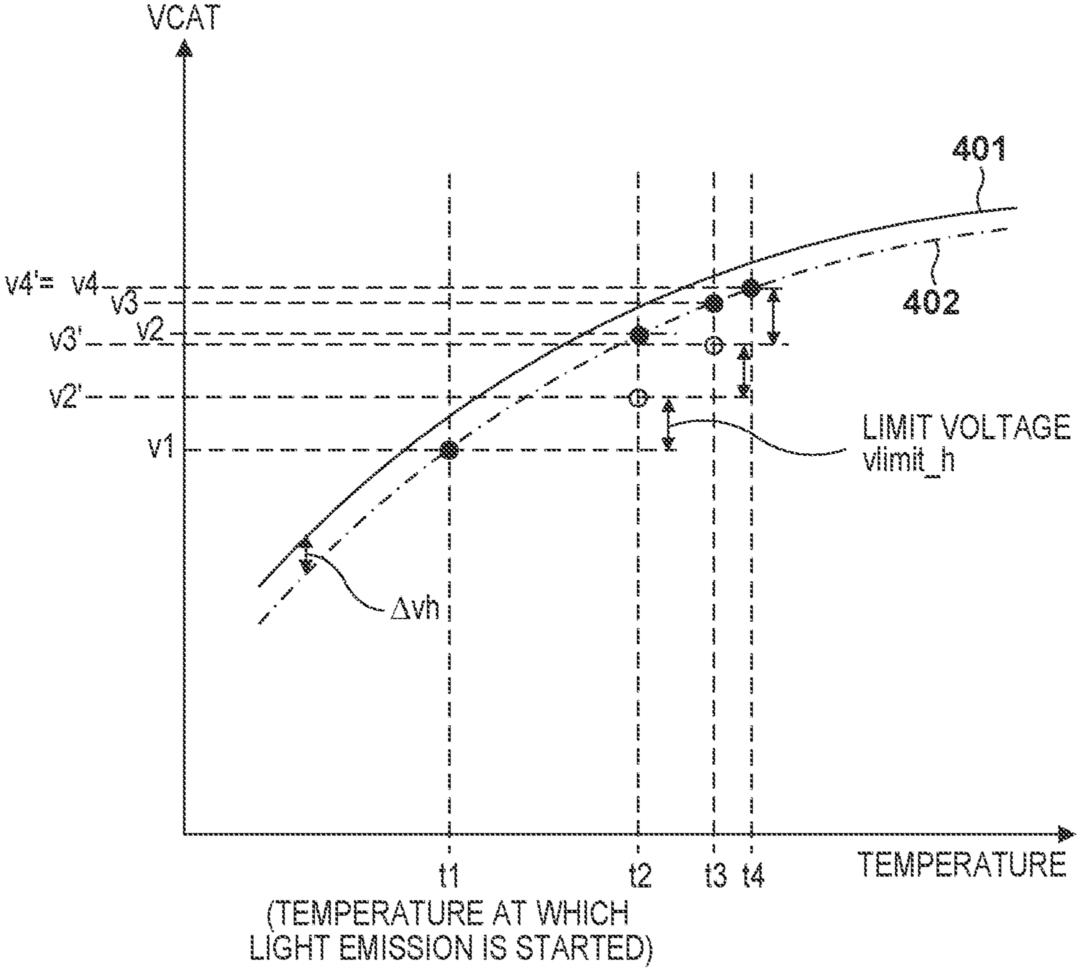
FIG. 4 is a diagram illustrating a method of setting a driving voltage of light emitting elements when the temperature of the display apparatus according to a first embodiment is increasing.

FIG. 4 is a diagram illustrating a method of setting the driving voltage Vdf of the light emitting elements 110 for when the temperature of the display apparatus 1 increases.

In FIG. 4, the horizontal axis indicates the temperature of the display apparatus 1, and the vertical axis indicates the second voltage VCAT. A relationship is such that the second voltage VCAT is high when the driving voltage Vdf is low, and so, the characteristic is opposite to the relationship of FIG. 3. The temperature of the display apparatus 1 is detected at a predetermined period.

A solid line 401 of FIG. 4 exemplifies a relationship between the temperature and the second voltage VCAT during light emission of the light emitting elements 110. The second voltage VCAT is set so as not to exceed a limited range, which is an upper limit of the second voltage VCAT indicated by the solid line 401 in relation to the temperature of the display apparatus 1. Actually, there is manufacturing variation in the light emitting elements and error in temperature detection, and so, the second voltage VCAT is set according to a dashed line 402, which is shifted in a direction of decreasing by a margin amount Δvh relative to the solid line 401.

In FIG. 4, at temperature t1 at the start of light emission, the second voltage VCAT is set to v1 according to the dashed line 402.

Next, at temperature t2 (>t1) after a predetermined time has elapsed from the start of light emission, v2 is an optimum value according to the dashed line 402; however, when the second voltage VCAT is changed from v1 to v2, the amount of change in the second voltage VCAT exceeds a limit voltage vlimit_h. As described above, when the amount of change in the second voltage VCAT is large, the display luminance transiently fluctuates. Therefore, by setting the second voltage VCAT to v2' by controlling the change in voltage of the second voltage VCAT to be within vlimit_h, it is possible to reduce luminance fluctuations.

Furthermore, at temperature t3 (>t2) after a predetermined time has elapsed from the temperature t2, v3 is an optimum value as the second voltage VCAT according to the dashed line 402; however similarly to the temperature t2, the second voltage VCAT is set to v3' by controlling the amount of change in the second voltage VCAT to be within the limit voltage vlimit_h.

Furthermore, at temperature t4 (>t3) after a predetermined time has elapsed from the temperature t3, v4 is an optimum value as the second voltage VCAT according to the dashed line 402 and a difference from v3' is within the limit voltage vlimit_h, and so the second voltage VCAT is set to v4.

Figure 5:
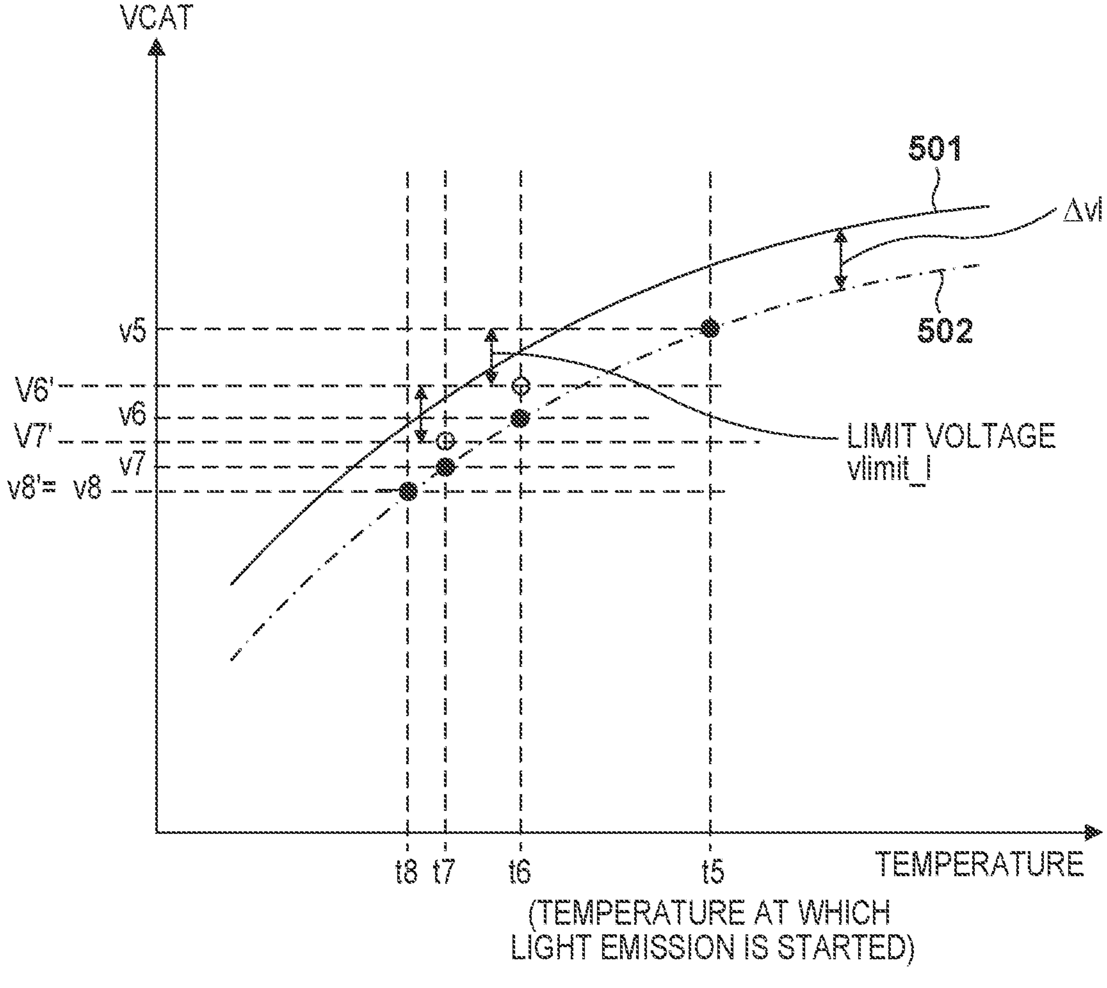
FIG. 5 is a diagram illustrating a method of setting a driving voltage of light emitting elements when the temperature of the display apparatus according to a first embodiment is decreasing.

FIG. 5 is a diagram illustrating a method of setting the driving voltage Vdf of the light emitting elements 110 for when the temperature of the display apparatus 1 decreases.

In FIG. 5, the horizontal axis indicates the temperature of the display apparatus 1, and the vertical axis indicates the second voltage VCAT. A relationship is such that the second voltage VCAT is high when the driving voltage Vdf is low, and so, the characteristic is opposite to that of the relationship of FIG. 3. The temperature of the display apparatus 1 is detected at a predetermined period.

A solid line 501 of FIG. 5 exemplifies a relationship between the temperature and the second voltage VCAT during light emission of the light emitting elements 110. The solid line 501 of FIG. 5 is the same as the solid line 401 of FIG. 4. The second voltage VCAT is set so as not to exceed a limited range, which is an upper limit of the second voltage VCAT indicated by the solid line 501 in relation to the temperature of the display apparatus 1. Actually, there is manufacturing variation in the light emitting elements and error in temperature detection, and so, the second voltage VCAT is set according to a dashed line 502, which is which is shifted in a direction of decreasing by a margin amount Δvl (>Δvh) relative to the solid line 501.

In FIG. 5, at temperature t5 at the start of light emission, the second voltage VCAT is set to v5 according to the dashed line 502.

Next, at temperature t6 (<t5) after a predetermined time has elapsed from the start of light emission, v6 is an optimum value according to the dashed line 502; however, when the second voltage VCAT is changed from v5 to v6, the amount of change in the second voltage VCAT exceeds a limit voltage vlimit_l. As described above, when the amount of change in the second voltage VCAT is large, the display luminance transiently fluctuates. Therefore, by setting the second voltage VCAT to v6' by controlling the change in voltage of the second voltage VCAT to be within vlimit_l, it is possible to reduce luminance fluctuations.

Furthermore, at temperature t7 (<t6) after a predetermined time has elapsed from the temperature t6, v7 is an optimum value as the second voltage VCAT according to the dashed line 502; however similarly to the temperature t6, the second voltage VCAT is set to v7' by controlling the amount of change in the second voltage VCAT to be within the limit voltage vlimit_l.

Furthermore, at temperature t8 (<t7) after a predetermined time has elapsed from the temperature t7, v8 is an optimum value as the second voltage VCAT according to the dashed line 502 and a difference from v7' is within the limit voltage vlimit_l, and so the second voltage VCAT is set to v8.

In the present embodiment, the limited ranges of FIGS. 4 and 5 are set to ranges in which the amount of change in the amount of light of the light emitting elements 110 accompanying the change in the driving voltage Vdf of the light emitting elements 110 falls within 3%.

In the present embodiment, the limited ranges of the second voltage VCAT are different when the temperature decreases and when the temperature increases. That is, the limit voltage vlimit_l for when the temperature decreases is set to a value that is greater than the limit voltage vlimit_h for when the temperature increases, and the margin amount Δvl 1 for when the temperature decreases is set to a value that is greater than the margin amount Δvh for when the temperature increases. This makes it possible to control the second voltage VCAT so as not to exceed the solid lines 401 and 501 of FIGS. 4 and 5.

In the present embodiment, the amount of change in the second voltage VCAT to be changed at one time is made to be smaller when the temperature of the display apparatus 1 increases (FIG. 4) than when the temperature of the display apparatus 1 decreases (FIG. 5); however, the period at which the second voltage VCAT is changed may be shortened when the temperature of the display apparatus 1 increases (FIG. 4) than when the temperature of the display apparatus 1 decreases (FIG. 5).

In addition, in the first embodiment, a method of setting the second voltage VCAT for when the temperature increases and for when the temperature decreases has been described; however, when the temperature increases from the temperature t1 at the start of light emission of FIG. 4, the second voltage VCAT does not exceed the solid line 401, and so, the control may be taken so as to control the second voltage VCAT only when the temperature decreases from the temperature t1.

In addition, the control may be taken so as to, after the driving voltage VDf has been set based on the temperature at the start of light emission of the light emitting elements 110, not change the driving voltage Vdf when the temperature of the display apparatus 1 increases and change the driving voltage Vdf when the temperature of the display apparatus 1 decreases. Similarly, the control may be taken so as to, after the driving voltage Vdf is set based on the temperature at the start of light emission of the light emitting elements 110, not change the driving voltage Vdf since the temperature of the display apparatus 1 will not stabilize until a predetermined time has elapsed from the start of light emission of the light emitting elements 110. In such a case, the temperature of the display apparatus 1 after the start of light emission of the light emitting elements 110 will be higher than that before light emission, and so, the driving voltage Vdf will not be insufficient.

The second voltage VCAT according to the present embodiment may be controlled by the control circuit 400 of the display apparatus 1 or, as in a second embodiment, may be controlled by a control unit 2 of an image capture apparatus 10 in which the display apparatus 1 is provided. The second voltage VCAT according to the present embodiment may be controlled in a blanking interval. In such a case, the control may be performed based on a look-up table in which the relationship between the temperature and the second voltage VCAT of the display apparatus 1 is stored. In addition, a plurality of look-up tables may be provided according to the temperature at the start of light emission of the light emitting elements 110.

By virtue of the above-described first embodiment, when the driving voltage Vdf of the light emitting elements 110 is controlled according to the luminance setting of the display apparatus 1 and the change in temperature of the light emitting elements 110, the driving voltage Vdf is controlled such that the amount of change in the driving voltage Vdf of the light emitting elements 110 per unit time does not exceed a predetermined limited range. This makes it possible to reduce power consumption, heat generation, and display quality deterioration of the display apparatus 1.

In the first embodiment, the second voltage VCAT may be controlled based on at least one of the temperature and a luminance setting of the display apparatus 1. In such a case, control need only be performed so as to decrease the driving voltage Vdf of the light emitting elements 110 as the temperature of the display apparatus 1 increases and decrease the driving voltage Vdf of the light emitting elements 110 as the luminance setting decreases.

Second Embodiment

In the second embodiment, an example in which the display apparatus 1 according to the first embodiment is provided in the image capture apparatus 10 and the driving voltage Vdf of the light emitting elements 110 described in the first embodiment is controlled at a timing at which the display luminance of the display apparatus 1 changes will be described.

Figure 6:
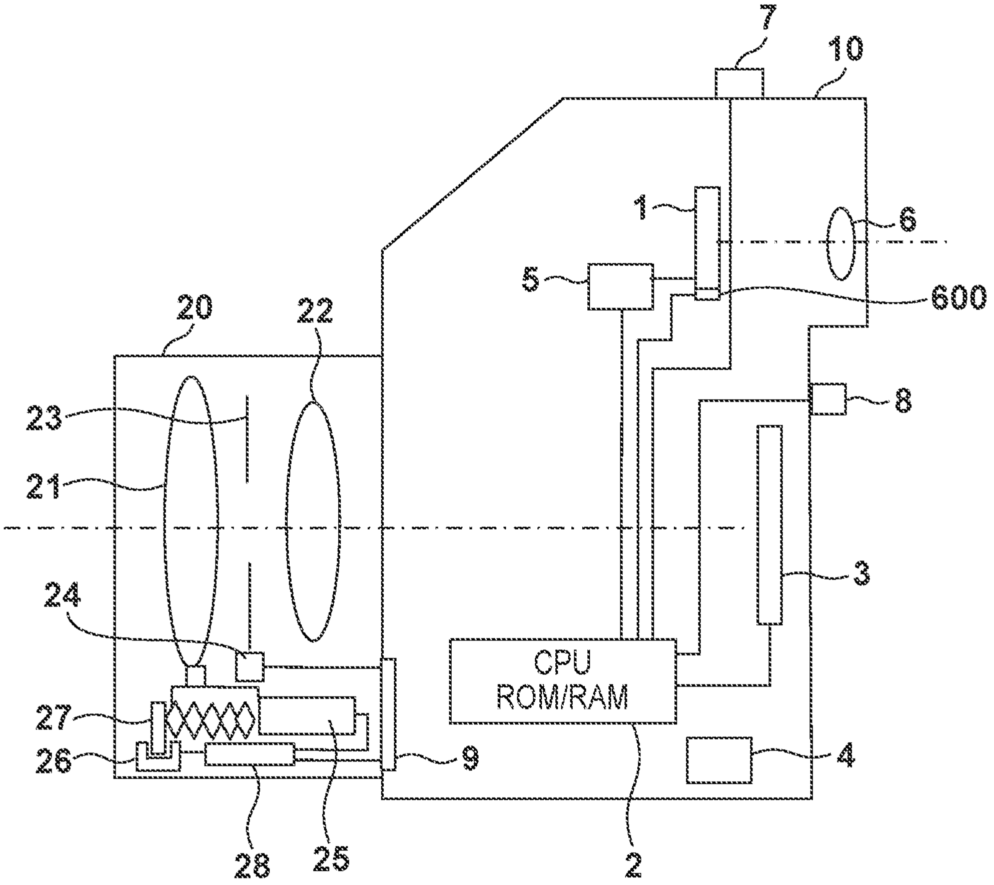
FIG. 6 is a schematic cross-sectional view illustrating a hardware configuration of an image capture apparatus according to a second embodiment.

FIG. 6 is a schematic sectional view illustrating a hardware configuration of the image capture apparatus 10 including the display apparatus 1 according to the first embodiment.

The image capture apparatus 10 is a lens-interchangeable digital camera to and from which a lens apparatus 20 can be attached and detached. The image capture apparatus 10 generates image data by capturing a subject image transmitted through the lens apparatus 20. The lens apparatus 20 is mechanically and electrically connected via a lens mount 9 of the image capture apparatus 10 and is controlled by the image capture apparatus 10.

The housing of the image capture apparatus 10 is provided with the display apparatus 1, the control unit 2, an image capture unit 3, a storage unit 4, a display driving unit 5, an eyepiece portion 6, a shutter button 7, and a function button 8.

The control unit 2 is a controller including a computational processor for controlling the components of the image capture apparatus 10, a ROM, a RAM, and the like.

The image capture unit 3 includes a global electronic shutter CMOS image sensor. The image capture unit 3 is arranged on an expected imaging surface of the lens apparatus 20, and exposure control is electrically performed.

The storage unit 4 is a storage medium, such as a memory card, for storing the captured image data.

The display driving unit 5 is a driver circuit for displaying an image by driving the display apparatus 1 illustrated in FIGS. 1 and 2 under the control of the control unit 2.

The eyepiece portion 6 includes an eyepiece lens for observing a subject image displayed on the display apparatus 1.

The shutter button 7 is turned on when operated halfway, or that is when a so-called half-pressed (an image shooting preparation instruction) is performed, as an operation performed by the user during image shooting and generates a first shutter switch signal SW1. The control unit 2 starts a shooting preparation operation, such as automatic focus (AF) processing, automatic exposure (AE) processing, an auto-white balance (AWB) processing, and a pre-flash (EF) processing in response to the first shutter switch signal SW1.

When the shutter button 7 is turned on when operated completely, or that is, when a so-called full-pressed (an image shooting instruction) is performed, as an operation performed by the user during image shooting, and generates a second shutter switch signal SW2. The control unit 2 starts a series of image shooting processing operations from the reading of signals from the image capture unit 3 to the writing of captured image data to the storage unit 4 in response to the second shutter switch signal SW2.

The function button 8 is an operation member for accepting a user operation for changing the operation mode of the image capture apparatus 10, changing the display luminance of the display apparatus 1, displaying a menu screen for various settings, and the like. The operation mode of the image capture apparatus 10 includes image shooting mode (live view mode) and reproduction mode.

The housing of the lens apparatus 20 is provided with lenses 21 and 22 for zooming and focusing, a diaphragm 23, a diaphragm driving unit 24, a lens driving mechanism 25, a rotation detection unit 26, a pulse plate 27, and an AF driving unit 28. In the example of FIG. 6, the lens apparatus 20 is configured by two lenses 21 and 22; however, it is needless to say that, actually, the lens apparatus 20 is configured by two or more lenses.

The diaphragm driving unit 24 includes an actuator, a driver circuit, and the like for driving the diaphragm 23 under the control of the control unit 2.

The lens driving mechanism 25 includes a motor and gears, a driver circuit, and the like for moving the lens 21 and 22 back and forth.

The rotation detection unit 26 is a photocoupler for detecting the rotation of the pulse plate 27 linked to the lens driving mechanism 25. The rotation detection unit 26 notifies the AF driving unit 28 of a detection result of the rotation of the pulse plate 27. The AF driving unit 28 moves the lenses 21 and 22 to an in-focus position by driving the lens driving mechanism 25 based on the rotation of the pulse plate 27 and lens driving information received from the image capture apparatus 10.

The control unit 2 determines image shooting information, such as the luminance setting of the display apparatus 1 and exposure time, (performs AE processing) by amplifying, logarithmically compressing, and A/D converting a luminance signal corresponding to the brightness of a field based on a photometric signal obtained from the image capture unit 3, which serves a role of a photometric sensor, and calculating field luminance information.

Furthermore, the control unit 2 A/D converts a signal voltage from a phase difference detection pixel included in the image sensor of the image capture unit 3 and performs image capturing surface phase-difference AF (AF processing) for calculating from the obtained signal a distance to a subject corresponding to a focus detection position.

Furthermore, as will be described later in FIG. 7, the control unit 2 controls the driving voltage Vdf of the light emitting elements 110 according to the timing at which the display luminance of the display apparatus 1 is changed. In this case, the timing at which the display luminance of the display apparatus 1 is changed is as follows.

(1) Timing at which an object to be displayed on the display apparatus 1 is changed The display object is a live view image, a menu screen, a reproduced image, or the like (2) Timing at which the luminance setting of the display apparatus 1 is changed A timing at which the user changes the luminance setting, a timing at which the luminance setting is automatically changed according to ambient brightness by a brightness adjustment function, a timing at which exposure is automatically changed, or the like When the driving voltage Vdf of the light emitting elements 110 falls below a voltage necessary for the light emitting elements 110 to emit light, the control unit 2 changes the driving voltage Vdf to a voltage at which the light emitting elements 110 can emit light within the limited range regardless of whether the display luminance has been changed.

Figure 7:
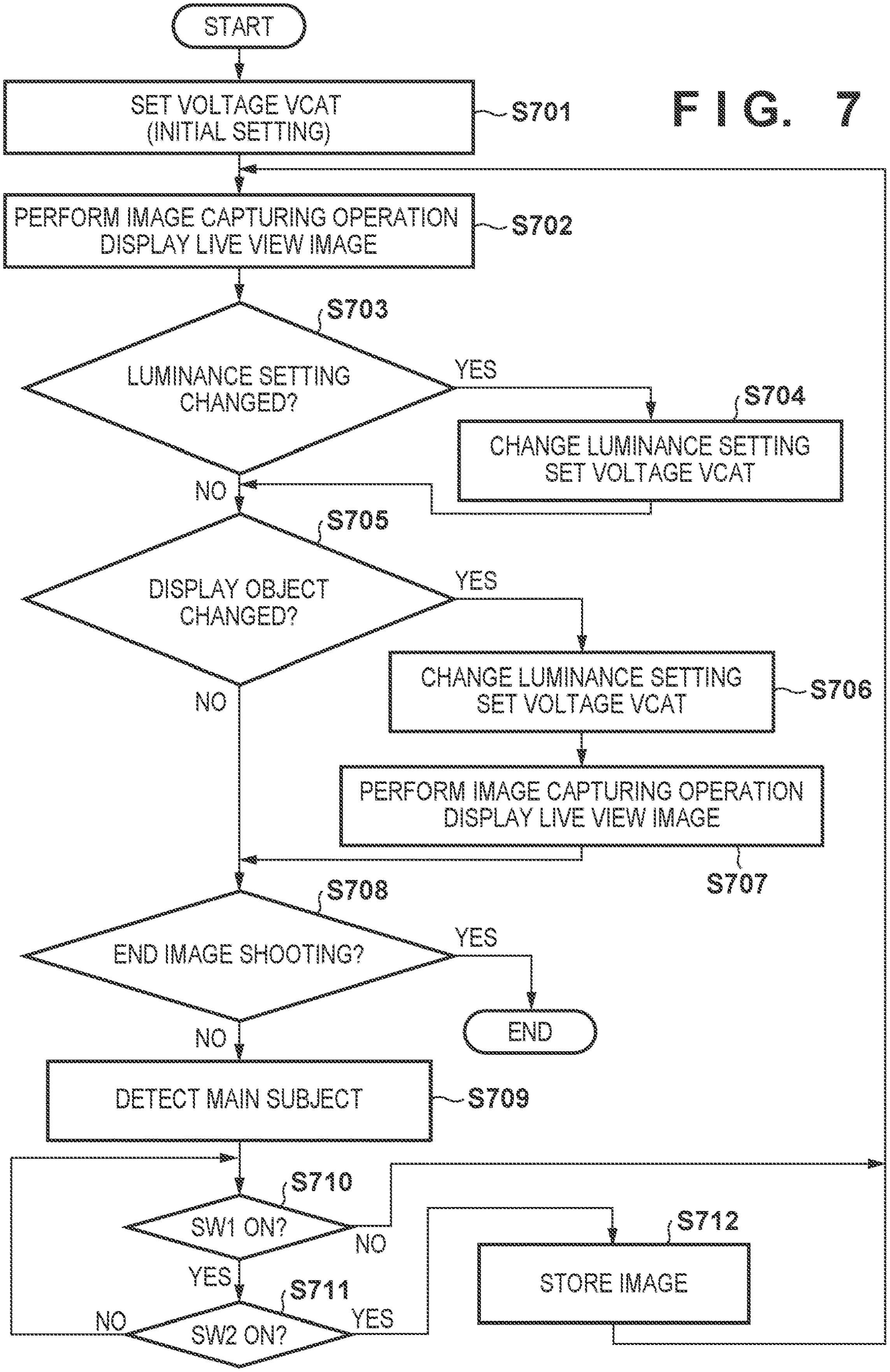
FIG. 7 is a flowchart illustrating an image shooting operation of the image capture apparatus according to the second embodiment.

FIG. 7 is a flowchart illustrating an image shooting operation of the image capture apparatus 10 according to the second embodiment.

The processing of FIG. 7 is realized by the control unit 2 controlling each component of the image capture apparatus 10 by executing a program stored in the ROM or the storage unit 4 and is started when the operation mode of the image capture apparatus 10 is in the image shooting mode.

In step S701, the control unit 2 sets the second voltage VCAT for setting the driving voltage Vdf of the light emitting elements 110 of the display apparatus 1 to an initial value. As described in FIG. 3, the initial value of the second voltage VCAT is set to the maximum voltage necessary for the light emitting elements 110 to emit light based on the maximum luminance and the displayable temperature range of the light emitting element 110.

In step S702, the control unit 2 starts an image capturing operation by the image capture unit 3 and displays the image (live view image) captured by the image capture unit 3 on the display apparatus 1. The user can observe the image being displayed on the display apparatus 1 via the eyepiece portion 6.

In step S703, the control unit 2 determines whether the luminance setting of the display apparatus 1 has been changed. When the control unit 2 determines that the luminance setting of the display apparatus 1 has been changed, the control unit 2 advances the processing to step S704. When the control unit 2 determines that the luminance setting of the display apparatus 1 has not been changed, the control unit 2 advances the processing to step S705. The control unit 2 performs the determination based on whether it is a timing at which the user changes the luminance setting, a timing at which the luminance setting is automatically changed by the brightness adjustment function, a timing at which exposure is automatically changed, or the like. For example, the control unit 2 measures the brightness of the live view image, determines a corresponding luminance setting from the three types of luminance settings of FIG. 3 based on the photometric result, and determines whether the luminance setting has been changed from the determined result.

In step S704, the control unit 2 changes the luminance setting of the display apparatus 1 to the luminance setting determined in step S703 and sets the second voltage VCAT according to the temperature of the display apparatus 1 of FIG. 4 or 5 such that the driving voltage Vdf causes the light emitting elements 110 to emit light at the light emission luminance corresponding to the changed luminance setting. Then, the control unit 2 outputs a control signal for controlling the second voltage VCAT to the control circuit 400 of the display apparatus 1. In this case, the luminance setting of the display apparatus 1 is changed, and so, there is no need to consider the transient luminance fluctuations due to the second voltage VCAT being changed. Therefore, there is no need to limit the amount of change in the second voltage VCAT as in the first embodiment, and the second voltage VCAT is changed at one go.

In step S705, the control unit 2 determines whether the display object of the display apparatus 1 is changed. When the control unit 2 determines that the display object of the display apparatus 1 is changed, the control unit 2 advances the processing to step S706. When the control unit 2 determines that the display object of the display apparatus 1 is not changed, the control unit 2 advances the processing to step S708. For example, the control unit 2 determines whether the display object is switched from the live view image to a menu screen or a reproduced image by the user operating the function button 8.

In step S706, the control unit 2 changes the luminance setting of the display apparatus 1 according to the brightness of the display object determined in step S705 and sets the second voltage VCAT according to the temperature of the display apparatus 1 of FIG. 4 or 5 such that the driving voltage Vdf causes the light emitting elements 110 to emit light at the light emission luminance corresponding to the changed luminance setting. In this case, the display object of the display apparatus 1 is changed in its entirety, and so, there is no need to consider the transient luminance fluctuations due to the second voltage VCAT being changed. Therefore, there is no need to limit the amount of change in the second voltage VCAT as in the first embodiment, and the second voltage VCAT is changed at one go. Then, when the control unit 2 determines that the user has ended the operation of the function button 8, the control unit 2 advances the processing to step S707.

In step S707, the control unit 2 resumes an image capturing operation by the image capture unit 3 and displays the image (live view image) captured by the image capture unit 3 on the display apparatus 1.

In step S708, the control unit 2 determines whether to terminate the image shooting operation according to the operation mode of the image capture apparatus 10 being changed or the like and, when the control unit 2 determines that the processing be terminated, terminates the processing and, when it is not determined that the processing be terminated, advances the processing to step S709.

In step S709, the control unit 2 performs main subject detection processing on the image (live view image) captured by the image capture unit 3. The control unit 2 determines a main subject position in the image displayed on the display apparatus 1 by performing human face detection or the like on the image captured by the image capture unit 3.

In step S710, the control unit 2 determines whether the first shutter switch signal SW1 has been turned on by the shutter button 7 being half-pressed (the image shooting preparation instruction being issued). When the control unit 2 determines that the first shutter switch signal SW1 has been turned on, the control unit 2 advances the processing to step S711. When it is not determined that the first shutter switch signal SW1 has been turned on, the control unit 2 returns the processing to step S702. The control unit 2 performs the automatic focus (AF) processing and the automatic exposure (AE) processing on the main subject determined in step S709 according to the first shutter switch signal SW1.

In step S711, the control unit 2 determines whether the second shutter switch signal SW2 has been turned on by the shutter button 7 being fully pressed (the image shooting instruction being issued). When the control unit 2 determines that the second shutter switch signal SW2 has been turned on, the control unit 2 advances the processing to step S712. When it is not determined that the second shutter switch signal SW2 has been turned on, the control unit 2 returns the processing to step S702.

In step S712, the control unit 2 executes image shooting processing in which the image data captured by the image capture unit 3 is written in the storage unit 4 according to the second shutter switch signal SW1 and returns the processing to step S702.

When the second voltage VCAT is likely to exceed the limited range illustrated in FIG. 5 due to the temperature of the display apparatus 1 decreasing in a state in which the luminance setting is not changed in step S703 or the display object is not changed in step S705, the second voltage VCAT is controlled to be suitable while limiting the amount of change in the second voltage VCAT as described in the first embodiment.

The aforementioned operation, which has been described to be performed by the control unit 2 of the image capture apparatus 10, may be performed by a single piece of hardware, or the entire apparatus may be controlled by the processing being divided among plurality of pieces of hardware (e.g., a plurality of processors and circuits).

By virtue of the above-described second embodiment, the driving voltage Vdf of the light emitting elements 110 of the display apparatus 1 can be appropriately controlled, similarly to the first embodiment, at a timing at which the display luminance of the display apparatus 1 is changed, and so, it is possible to reduce power consumption, heat generation, and display quality deterioration of the display apparatus 1.

Third Embodiment

In a third embodiment, an example in which, when the control of the driving voltage Vdf of the light emitting elements 110 described in the second embodiment is performed, the update frequency of the driving voltage Vdf is reduced by the driving voltage Vdf set in anticipation of the change in temperature of the light emitting elements 110 after the display luminance of the display apparatus 1 is changed will be described.

Figure 8:
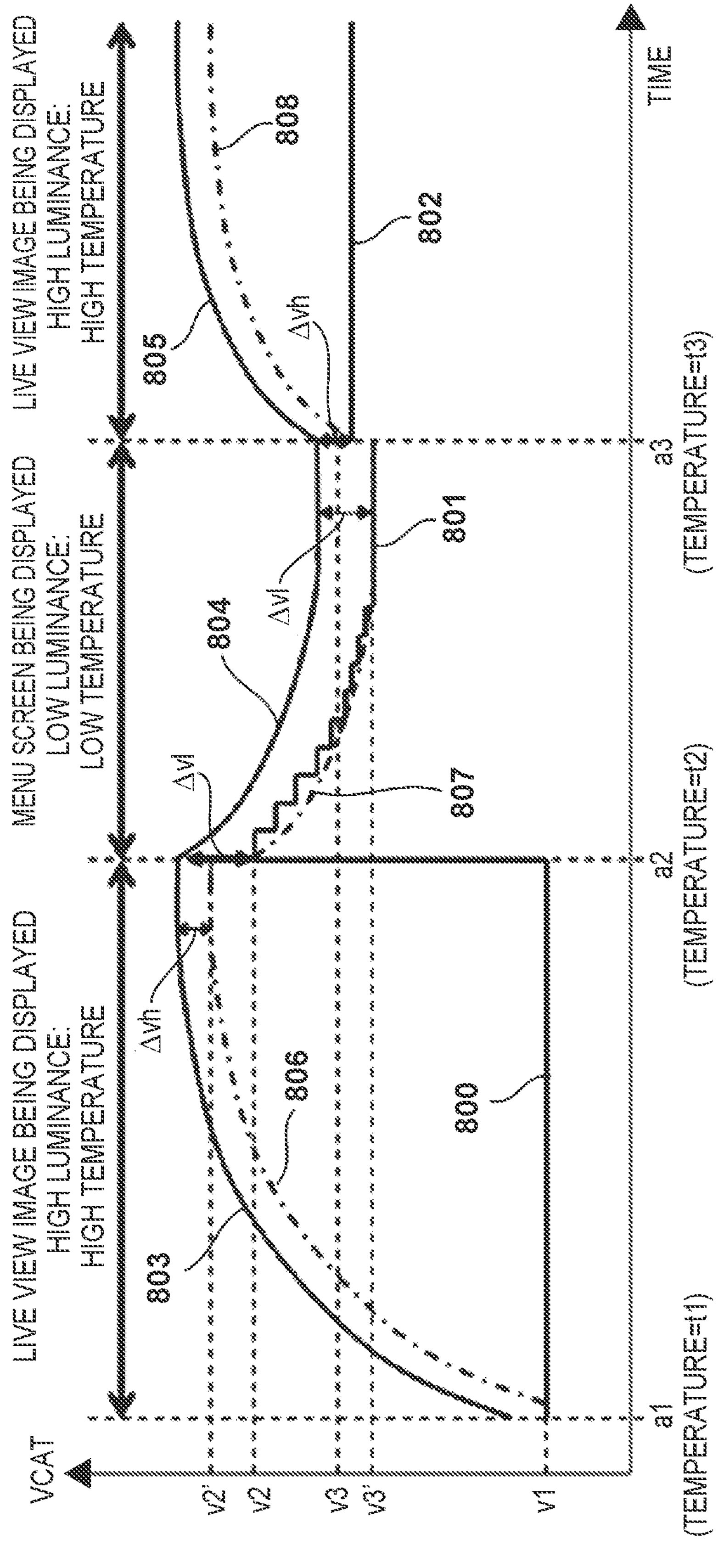
FIG. 8 is a diagram illustrating a method of setting a driving voltage of light emitting elements of the display apparatus according to a third embodiment.

FIG. 8 is a diagram illustrating a method of setting the driving voltage of the light emitting elements 110 according to the third embodiment.

In FIG. 8, the horizontal axis indicates time, and the vertical axis indicates the second voltage VCAT.

Lines 800, 801, and 802 indicate voltages to be set as the second voltage VCAT. In addition, the solid lines 803, 804, and 805 exemplifies a relationship between the temperature and the second voltage VCAT during light emission of the light emitting elements 110. The second voltage VCAT is set so as not to exceed a limited range, which is an upper limit of the second voltage VCAT indicated by the solid lines 803, 804, and 805 in relation to the temperature of the display apparatus 1. Actually, there is manufacturing variation in the light emitting elements and error in temperature detection, and so, the second voltage VCAT is set according to dashed lines 806, 807, and 808, which are shifted in a direction of decreasing by the margin amounts Δvh relative to the solid lines 803, 804 and 805. Δvh and Δvl are similar to the margin amount Δvh for when the temperature increases and the margin amount Δvl for when the temperature decreases described in FIG. 4 and FIG. 5 of the first embodiment.

First, when an image shooting operation is started at time a1 and a live view image is displayed on the display apparatus 1, the second voltage VCAT at temperature t1 of the time a1 is set to v1 (straight line 800). In this case, the display object is a high luminance live view image, and so, the temperature of the display apparatus 1 increases; however, the second voltage VCAT is kept constant at v1 (straight line 800) without being changed until the display object is changed.

Next, when the display object is changed to a menu screen at time a2, the second voltage VCAT at temperature t2 of the time a2 is set to v2', which has been shifted from the solid line 803 by the margin amount Δvh. However, it is known that the menu screen, which is the display object, is of low luminance, and so, it can be predicted that the temperature t2 after the menu screen is displayed will decrease from the temperature t1 of when the live view image is displayed. Therefore, at the time a2, the second voltage VCAT is set to v2, which has been shifted from the solid line 803 by the margin amount Δvl for when the temperature decreases. By thus setting the second voltage VCAT to v2 for when the temperature has decreased from the temperature t2 instead of v2' at the temperature t2 immediately after the display luminance has been changed, it is possible to reduce the update frequency of the second voltage VCAT when the temperature decreases after the display luminance has been changed. Then, the temperature decreases from the time a2, after the display luminance has been changed, to time a3, and so, similarly to FIG. 5 of the first embodiment, the second voltage VCAT is controlled while limiting the amount of change in the second voltage VCAT so as not to exceed the solid line 804.

Next, when the display object is changed to a live view image at the time a3, the second voltage VCAT at the temperature t3 of the time a3 is set to v3', which has been shifted from the solid line 804 by the margin amount Δvl. However, the display luminance of the live view image, which is the display object, can be predicted to be approximately equal to the temperature prior to the switch to the menu screen, and it can be predicted that the temperature after the live view image is displayed will increase from the temperature t3 for when the menu screen is displayed. Therefore, at the temperature t3 of the time a3, the second voltage VCAT is set to v3, which has been shifted from the solid line 804 by the margin amount Δvh for when the temperature increases. By thus setting the second voltage VCAT to v3 for when the temperature has increased from the temperature t3 instead of v3' at the temperature t3 immediately after the display luminance has been changed, it is possible to bring the second voltage VCAT after the display luminance has been changed closer to the optimum value for after the temperature has increased, and it becomes possible to reduce the update frequency of the second voltage VCAT as well as reduce power consumption.

In the third embodiment, a method of setting the second voltage VCAT in anticipation of both when the temperature increases and when the temperature decreases has been described; however, the second voltage VCAT may be controlled for either when the temperature increases or when the temperature decreases.

By virtue of the above-described third embodiment, in addition to the effects of the second embodiment, it is possible to increase the effect of reducing power consumption and heat generation of the display apparatus 1 by reducing the update frequency of the driving voltage Vdf by setting the driving voltage Vdf in anticipation of the change in temperature of the light emitting elements 110 after the display luminance of the display apparatus 1 has been changed.

The present invention is not limited to the above-described embodiments and, for example, is also applicable to a case where a plurality of display apparatuses are provided, such as in a head-mounted display. When a plurality of display apparatuses are provided, the control may be taken so as to control the driving voltage supplied to all of the display apparatuses in common. When the voltage control is performed in common, the driving voltage is controlled based on the lowest temperature among the temperatures of all the display apparatuses.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-127325, filed Aug. 9, 2022 which is hereby incorporated by reference herein in its entirety.

What is claimed is:

1. A display apparatus comprising:

light emitting elements that are driven by current; and a voltage control unit that controls a driving voltage for driving the light emitting elements based on at least one of a temperature of the display apparatus and a display luminance of the display apparatus such that the driving voltage decreases as the temperature of the display apparatus increases and the driving voltage decreases as the display luminance decreases, wherein the voltage control unit performs control such that an amount of change in the driving voltage per unit time does not exceed a predetermined limited range, and wherein the predetermined limited range is determined based on a relationship between the change in the driving voltage and a change in a light emission luminance of the light emitting elements.

2. The apparatus according to claim 1, wherein the amount of change in the driving voltage per unit time includes at least one of an amount of change in the driving voltage at one time and a period at which the driving voltage is changed.

3. The apparatus according to claim 1, wherein the predetermined limited range is different when the temperature of the display apparatus increases and when the temperature of the display apparatus decreases.

4. The apparatus according to claim 1, wherein the predetermined limited range is determined according to a relationship between a change in the temperature of the display apparatus and the change in the driving voltage.

5. The apparatus according to claim 1, further comprising:

a temperature detection unit that detects the temperature of the display apparatus, wherein the voltage control unit controls the driving voltage based on a temperature detected at a predetermined period by the temperature detection unit.

6. The apparatus according to claim 2, wherein the amount of change in the driving voltage at one time when the temperature of the display apparatus increases is smaller than the amount of change in the driving voltage at one time when the temperature of the display apparatus decreases.

7. The apparatus according to claim 2, wherein the period at which the driving voltage is changed when the temperature of the display apparatus increases are shorter than the period at which the driving voltage is changed when the temperature of the display apparatus decreases.

8. The apparatus according to claim 1, wherein the voltage control unit does not change the driving voltage set based on a temperature at the start of light emission of the light emitting elements when the temperature of the display apparatus increases.

9. The apparatus according to claim 1, wherein the voltage control unit does not change the driving voltage set based on a temperature at the start of light emission of the light emitting elements for a predetermined amount of time from the start of the light emission of the light emitting elements.

10. The apparatus according to claim 1, wherein the voltage control unit controls the driving voltage based on a look-up table in which a relationship between the temperature of the display apparatus and the driving voltage is stored.

11. The apparatus according to claim 1, wherein the predetermined limited range is a range in which a change in an amount of light of the light emitting elements due to the change in the driving voltage is 3% or less.

12. The apparatus according to claim 1, wherein the light emitting elements emit light by current being caused to flow across the light emitting elements due to a potential difference between a first voltage and a second voltage, and wherein the voltage control unit controls the driving voltage by changing the second voltage while the first voltage is constant.

13. The apparatus according to claim 1, wherein the light emitting elements emit light by current being caused to flow across the light emitting elements due to a potential difference between a first voltage and a second voltage, and wherein the voltage control unit controls the driving voltage by changing the second voltage while the first voltage is constant.

14. A display apparatus comprising:

light emitting elements that are driven by current; and a voltage control unit that controls a driving voltage for driving the light emitting elements based on a temperature of the display apparatus, wherein the voltage control unit changes the driving voltage when a display object of the display apparatus is changed, and wherein the display object is at least one of a live view image, a menu screen, and a reproduced image.

15. A method of controlling a display apparatus including light emitting elements to be driven by current, the method comprising:

controlling a driving voltage for driving the light emitting elements based on at least one of a temperature of the display apparatus and a display luminance of the display apparatus such that the driving voltage decreases as the temperature of the display apparatus increases and the driving voltage decreases as the display luminance decreases, wherein in the controlling, an amount of change in the driving voltage per unit time is controlled so as not to exceed a predetermined limited range, and wherein the predetermined limited range is determined based on a relationship between the change in the driving voltage and a change in a light emission luminance of the light emitting elements.

16. A non-transitory computer-readable storage medium storing a program for causing a computer to function as a display apparatus comprising:

light emitting elements that are driven by current; and a voltage control unit that controls a driving voltage for driving the light emitting elements based on at least one of a temperature of the display apparatus and a display luminance of the display apparatus such that the driving voltage decreases as the temperature of the display apparatus increases and the driving voltage decreases as the display luminance decreases, wherein the voltage control unit performs control such that an amount of change in the driving voltage per unit time does not exceed a predetermined limited range, and wherein the predetermined limited range is determined based on a relationship between the change in the driving voltage and a change in a light emission luminance of the light emitting elements.

* * * * *